(12) United States Patent
Brock et al.

(10) Patent No.: US 6,662,251 B2
(45) Date of Patent: Dec. 9, 2003

(54) SELECTIVE TARGETING OF TRANSACTIONS TO DEVICES ON A SHARED BUS

(75) Inventors: Bishop Chapman Brock, Coupland, TX (US); Gary Dale Carpenter, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 09/817,089

(22) Filed: Mar. 26, 2001

(65) Prior Publication Data

US 2002/0138677 A1 Sep. 26, 2002

(51) Int. Cl.$^7$ ............................................. G06F 13/00
(52) U.S. Cl. ................................... 710/110; 709/208
(58) Field of Search .......................... 710/100, 107, 710/110, 113, 309, 36, 37, 240, 241, 306; 709/200, 208

(56) References Cited

U.S. PATENT DOCUMENTS 5,006,981 A * 4/1991 Beltz et al. .................. 710/305
5,454,082 A * 9/1995 Walrath et al. ............. 710/108
6,473,825 B1 * 10/2002 Worley et al. ............... 710/306

FOREIGN PATENT DOCUMENTS

EP          000901080 A1 * 3/1999 ........... G06F/13/16

* cited by examiner

Primary Examiner—Xuan M. Thai
(74) Attorney, Agent, or Firm—Joseph P. Lally; Casimer K. Salys (57) ABSTRACT

A system in which bus signals are selectively modified to effectively isolate desired bus agents from the bus. The selective modification of bus signals may be determined from a stored table (permission table) indicating permitted and prohibited bus transaction initiator/target pairs. The permission table may be located in a dedicated device, such as a programmable logic array or application specific integrated circuit. Alternatively, the permission table may be integrated into the bus arbiter. The permission table may be used to provide a unique 1-bit signal to each bus agent indicating whether the corresponding bus agent is permitted to receive transactions from the current bus master. The permission bit may be routed to external gating circuitry associated with each bus agent. The gating circuitry may receive one or more bus control signals and may modify the control signals depending upon the state of the permission bit. In an embodiment in which the bus is a PCI bus, the gating circuitry may receive the FRAME# and GNT# signals for each bus agent.

22 Claims, 9 Drawing Sheets

FIG. 1

PRIOR ART

SELECTIVE TARGETING OF TRANSACTIONS TO DEVICES ON A SHARED BUS

BACKGROUND

1. Field of the Present Invention

The present invention generally relates to the field of data processing systems and more particularly to a data processing system in which transactions on a shared bus are delivered to selected targets on the bus.

2. History of Related Art

In the field of data processing systems, the use of standardized peripheral busses is well known. Among the more prevalent of such busses is the Peripheral Components Interface (PCI) bus as specified in the *PCI Local Bus Specification Rev.* 2.2 available from the PCI Special Interest Group 5440 SW Westgate Drive, Suite 217, Portland, Oreg. 97221. Devices connected to the PCI bus are all mapped into a common, shared address space. Any bus master or transaction initiator can access any target device simply by reading or writing the target's portion of the shared address space. PCI transactions are said to be anonymous because target devices are unable to determine the initiator of a transaction. The shared, anonymous characteristics of PCI are generally desirable attributes for conventional PCI environments in which a CPU or set of CPUs is one of the bus agents and the computer system peripherals are the other bus agents.

Figure 1:
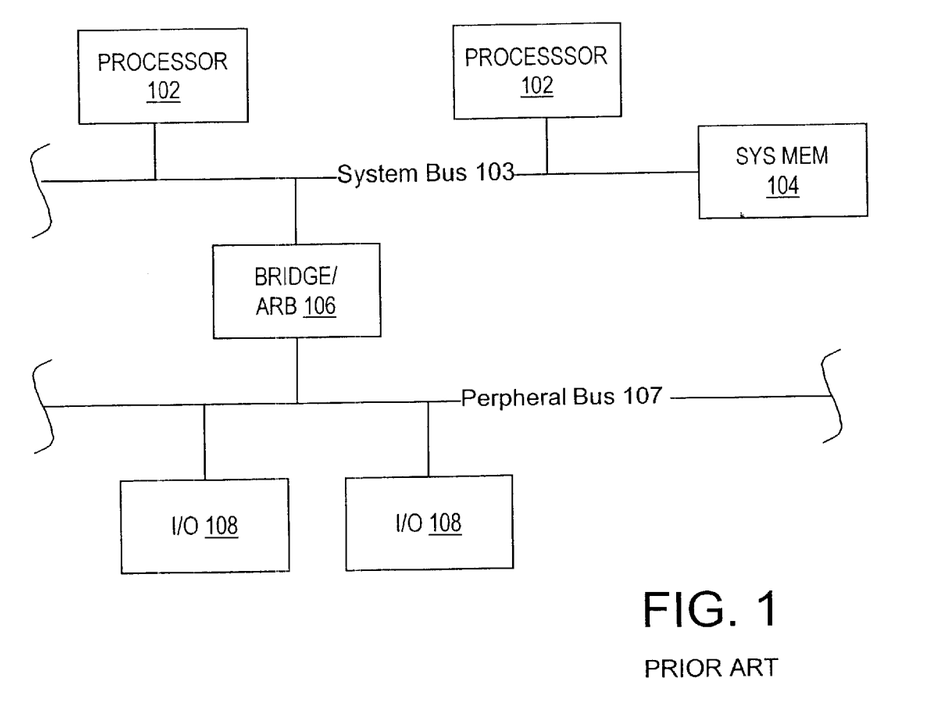
FIG. 1 is a block diagram of selected elements of a data processing system according to the prior art.

Referring to FIG. 1, a data processing system 100 typical of the prior art is depicted. Data processing system 100 includes one or more processors 102 that are each connected to a system bus 103. Processors 102 can access a system memory 104 via the system bus 103. In addition, a bus bridge/bus arbiter 106 is connected between the system bus 103 and a peripheral bus 107. For purposes of this discussion, the peripheral bus 107 is typically compliant with Rev 2.2 of the PCI Local Bus specification. One or more peripheral device(s) or adapter(s) 108 are connected to the peripheral bus 107. Peripheral devices 108 may include any number of devices including, as examples, hard disk adapters, graphics adapters, audio adapters, and high-speed network adapters. The address space of bus 107 is divided among peripheral devices 108. Typically, each peripheral device 108 tied to peripheral bus 107 is able to "see" every transaction that occurs on the bus. More specifically, all devices 108 on bus 107 receive the same data, address, and control signals. Thus, bus 107 is referred to as a shared bus. In addition, transactions on bus 107 are anonymous because the data, address, and control signals of bus 107 typically do not include information indicating the device that originated the transaction.

While a shared and anonymous bus may be suitable for traditional microprocessor based designs, it may be undesirable in a PCI-based multiprocessor environment. For purposes of this disclosure, a PCI-based multiprocessing system refers to a computer system in which multiple CPUs are connected to a single PCI bus. In this environment, it may be desirable to isolate or secure selected processors from others. Additionally, it may be desirable in a multiprocessor system to enable "private conversations" between processors or between one or more processors and selected peripherals. The shared address space and anonymous transactions of the currently implemented PCI standard prevents such private or secure transactions. It would, therefore, be highly desirable to implement a system and method for enabling individual devices on a common PCI bus to communicate privately such that others are effectively prevented from seeing the communication. It would be further desirable if the implemented system did not require modification of existing PCI compliant devices and did not require alteration or amendment of the PCI specification itself. It would be still further desirable if the implemented solution did not require complex or extensive modifications to existing hardware.

SUMMARY OF THE INVENTION

The problems identified above are in large part addressed by a system in which bus signals are selectively modified to effectively isolate desired bus agents from the bus. The selective modification of bus signals may be determined from a stored table (permission table) indicating permitted and prohibited bus transaction initiator/target pairs. The permission table may be located in a dedicated device, such as a programmable logic array or application specific integrated circuit. Alternatively, the permission table may be integrated into the bus arbiter. The permission table may be dynamically modified in the preferred embodiment and may be used to provide a unique 1-bit signal to each bus agent. The permission signal may indicate whether the corresponding bus agent is permitted to receive transactions from the current bus master. The permission bit may be routed to external gating circuitry associated with each bus agent. The gating circuitry may receive one or more bus control signals and may modify the control signals depending upon the state of the permission bit. In an embodiment in which the bus is a PCI bus, the gating circuitry may receive a bus control signal such as the FRAME# signal and the GNT# signals for each bus agent. If the corresponding permission signal is inactive or de-asserted, thereby indicating a prohibited initiator/target pair, the FRAME# signal and perhaps the GNT# signal are isolated from the bus agent and the gating circuit maintains the bus agent's FRAME# and GNT# pins at VCC thereby preventing the bus agent from recognizing a bus transaction.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a system in which agents on a PCI bus are enabled to communicate privately with one another and in which transactions are delivered to only selected targets on the bus. The use of selective targeting of transactions is particularly useful on systems in which multiple processors are tied to a common peripheral bus. By incorporating circuitry of modest complexity into a data processing system, the present invention is able to provide for secure communication between selected initiators and targets on a shared bus. Moreover, through proper implementation of the hardware required to achieve these selectively targeted transactions, the present invention is able to dynamically alter the relationship between initiators of transactions and the targets that are permitted to see those transactions.

Figure 3:
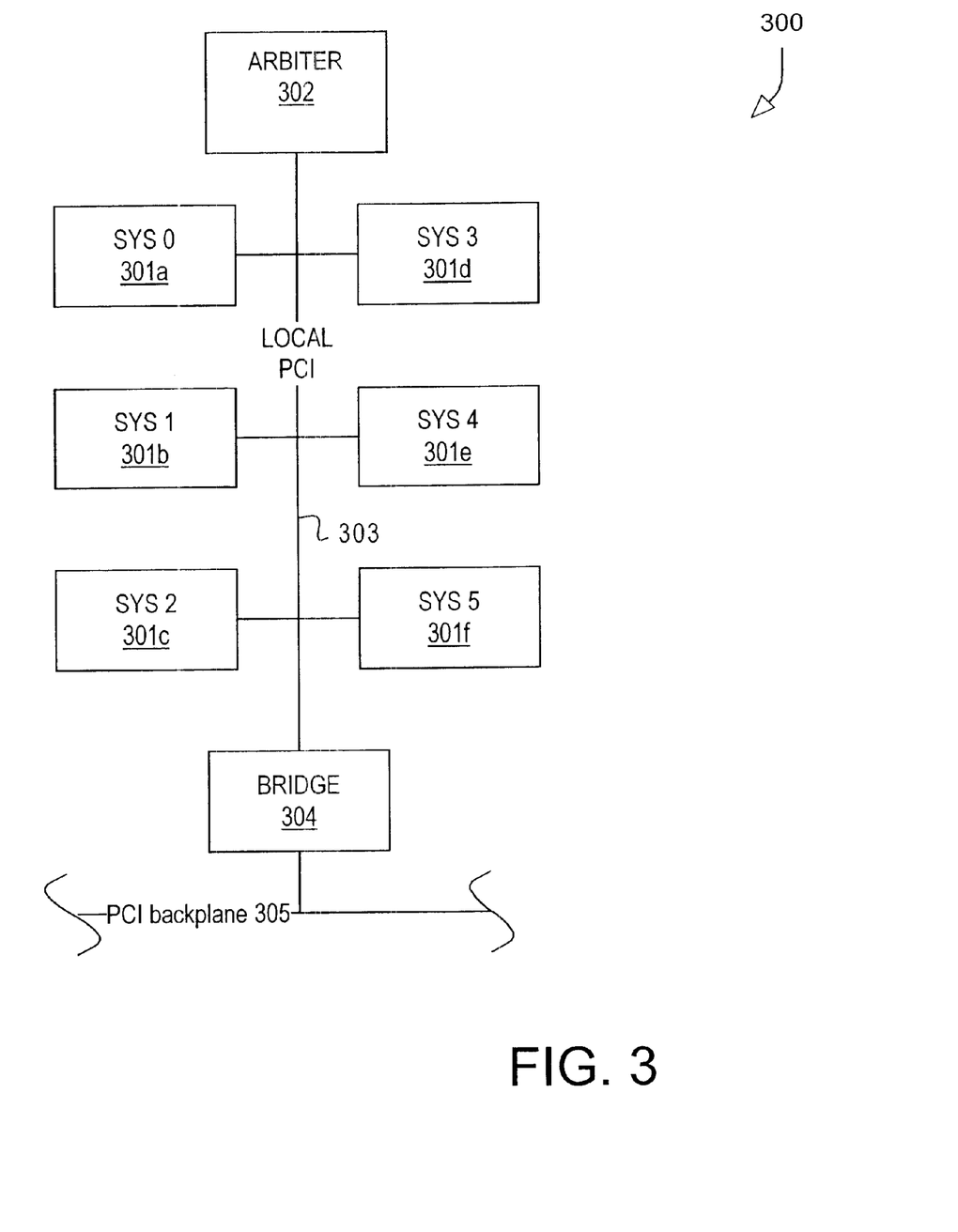
FIG. 3 is a block diagram illustrating selected components of a data processing system according to one embodiment of the invention in which multiple processors are connected to a single PCI bus.

Turning now to the drawings, FIG. 3 illustrates selected features of a system or combination 300 of data processing devices suitable for implementing the present invention. The depicted embodiment of combination 300 is a PCI based multi-processor system that includes a plurality of microprocessor based data processing systems 301a, 301b, 301c, 301d, 301e, and 301f (generically or collectively referred to herein as data processing system(s) 301) connected to each via a PCI bus referred to herein as local PCI bus 303. A bus bridge 304 provides a connection to a second PCI bus referred to herein as the PCI backplane 305. In one embodiment, PCI backplane 305 provides a bus suitable for connecting peripheral devices shared by the set of data processing systems 301. The combination 300 may include, for example, a shared display device (not depicted) connected to the PCI backplane 305 through a graphics adapter.

The combination 300 as depicted further includes an arbiter 302 that controls access to local PCI bus 303. Each data processing system 301 as well as bus bridge 304 may request and receive mastership of local bus 303. A requesting device typically obtains mastership of PCI local bus 303 by asserting a request signal (REQ#). A unique REQ# signal is dedicated for each system 301 as well as for any other potential masters of local PCI bus 303. The set of REQ# signals are routed to arbiter 302. Arbiter 302 includes arbitration logic suitable for granting mastership of local PCI bus 303 to the bus agents. Arbiter 302 typically provides a unique grant signal (GNT#) to each bus agent. The arbitration logic is configured to assert one of the GNT# signals based upon the state of the incoming REQ# signals. If a single REQ# signal is asserted, arbiter 302 will grant mastership of local PCI bus 303 to the corresponding agent at the next available bus cycle. If multiple REQ# signals are asserted simultaneously, arbiter 302 is configured to select from among the asserted signals based upon some form of selection algorithm or fairness algorithm. Arbiter 302 may, for example, grant mastership to the agent with the oldest outstanding request. In other embodiments, mastership grants may be prioritized according to any of a number of prioritization algorithms known in the field of bus arbitration.

Figure 2:
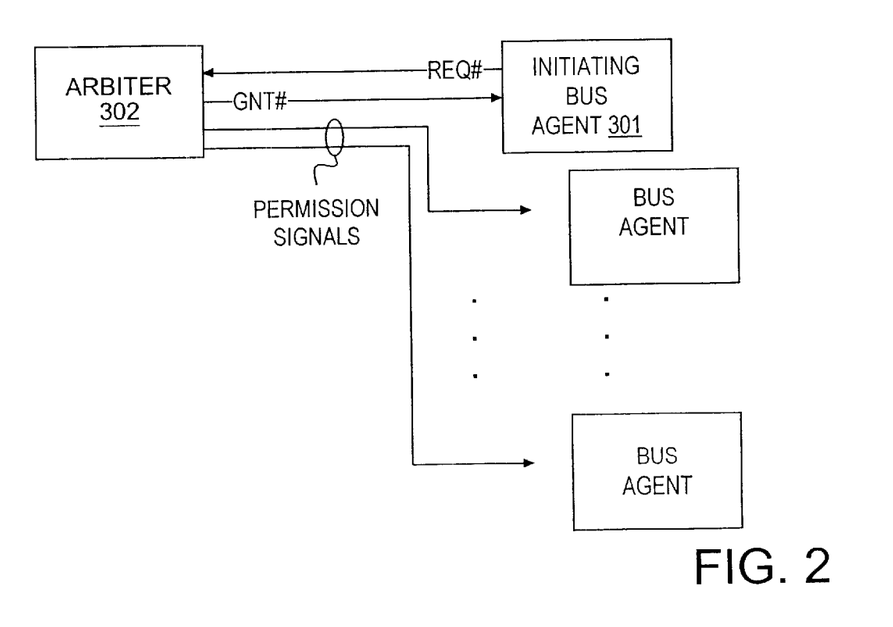
FIG. 2 is a block diagram illustrating selected components of a data processing system according to one embodiment of the invention.

In the depicted embodiment, arbiter 302 further includes dedicated logic referred to herein as permission logic that is responsible for generating permission information. The permission information is used in conjunction with the grant signals GNT# to provide selective authorization for agents on local PCI bus 303 to receive transactions. The selective authorization is based upon the identity of the initiating agent (the bus master). FIG. 2 illustrates the signals passed between arbiter 302, an initiating bus agent (identified by reference numeral 301a), and other bus agents 301 that are potential targets of the transaction generated by the initiator. As described previously, each initiating bus master 301 provides a unique REQ# signal to arbiter 302 and receives a unique GNT# signal from arbiter 302 as required by and compliant with the PCI specification. According to the present invention, however, arbiter 302 provides a unique signal, the permission signal, to each bus agent 301 that is a potential target of PCI transactions. The set of permission signals provides a mechanism by which transactions can be delivered selectively to bus agents 301 on the local PCI bus 303. In one embodiment, each permission signal is a single bit (single line) signal that indicates if the corresponding bus agent is authorized to receive transactions from the current bus master. If a particular permission signal is de-asserted, the bus agent 301 associated with that permission signal is isolated from local PCI bus 303 and thereby prevented from seeing transactions that occur on the bus. In one embodiment, the invention prevents bus agents from seeing transactions by preventing the bus agents from seeing the assertion of selected PCI control signals. If a PCI compliant device does not receive the appropriate control signals indicating the beginning of a new PCI transaction, the device is effectively prevented from recognizing the transaction. In other words, by selectively gating PCI control signals to the appropriate bus agents based upon the identity of the bus agent initiating a transaction, the transaction can be selectively delivered to the desired bus agents and securely withheld from the remaining agents. In this manner, a PCI based multi-processor system can incorporate secure transactions and preferably without alteration of the PCI interfaces of the component devices, or without altering the PCI connectors in the case of removable PCI devices.

Figure 4:
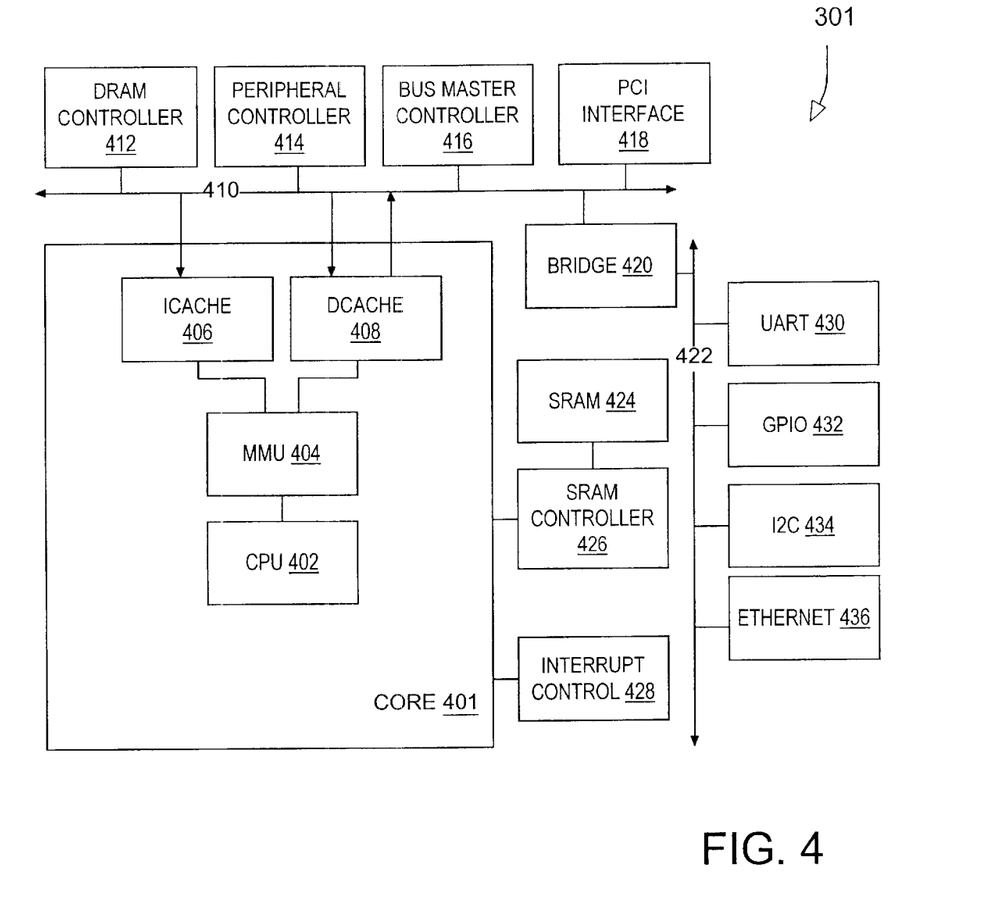
FIG. 4 is a block diagram of selected features of a processor suitable for use in the data processing system of FIG. 3.

Referring now to FIG. 4, a block diagram of selected elements of a system suitable for use as the data processing systems 301 of FIG. 3. In the depicted embodiment, each data processing system 301 is implemented with an embedded, system-on-chip design. In one such embodiment, data processing system 301 includes a core 401 that includes a central processing unit (CPU) 402, an integrated memory management unit (MMU) 404, and a dedicated instruction cache (ICACHE) 406 and data cache (DCACHE) 408. The core 401 may be implemented with a reduced instruction set (RISC) design such as the PowerPC® 405B3 Embedded Core from IBM Corporation in which a 5-stage pipelined CPU is integrated with the MMU, a 16 KB instruction cache, and an 8 KB data cache.

The core 401 communicates with a local bus 410 to which various integrated units including a DRAM controller 412, a peripheral controller 414, a bus master controller 416, and a PCI interface 418 are connected. Local bus 410 of system 301 is connected through a bus bridge 420 to a peripheral bus 420. The peripheral bus enables the core 401 to communicate with various integrated peripherals including one or more serial port(s) (UART) 430, a set of general purpose I/O (GPIO) ports 432, an I$^2$C interface 434, and an Ethernet port 436 that enables system 301 to communicate with an externally connected network. System 401 may further include an interrupt controller 428 and an on-chip (SRAM) 424 and a corresponding controller 426 enabling single cycle access to critical code and data. The PowerPC® 405GP Embedded Processor from IBM Corporation is a device suitable for use as the depicted embodiment of data processing system 301. In this embodiment, it will be appreciated by those skilled in the field that data processing system 301 is a highly integrated embedded processor device offering high performance in a low power (<1.1W), single package configuration suitable for dense applications in thermally sensitive environments.

Figure 5:
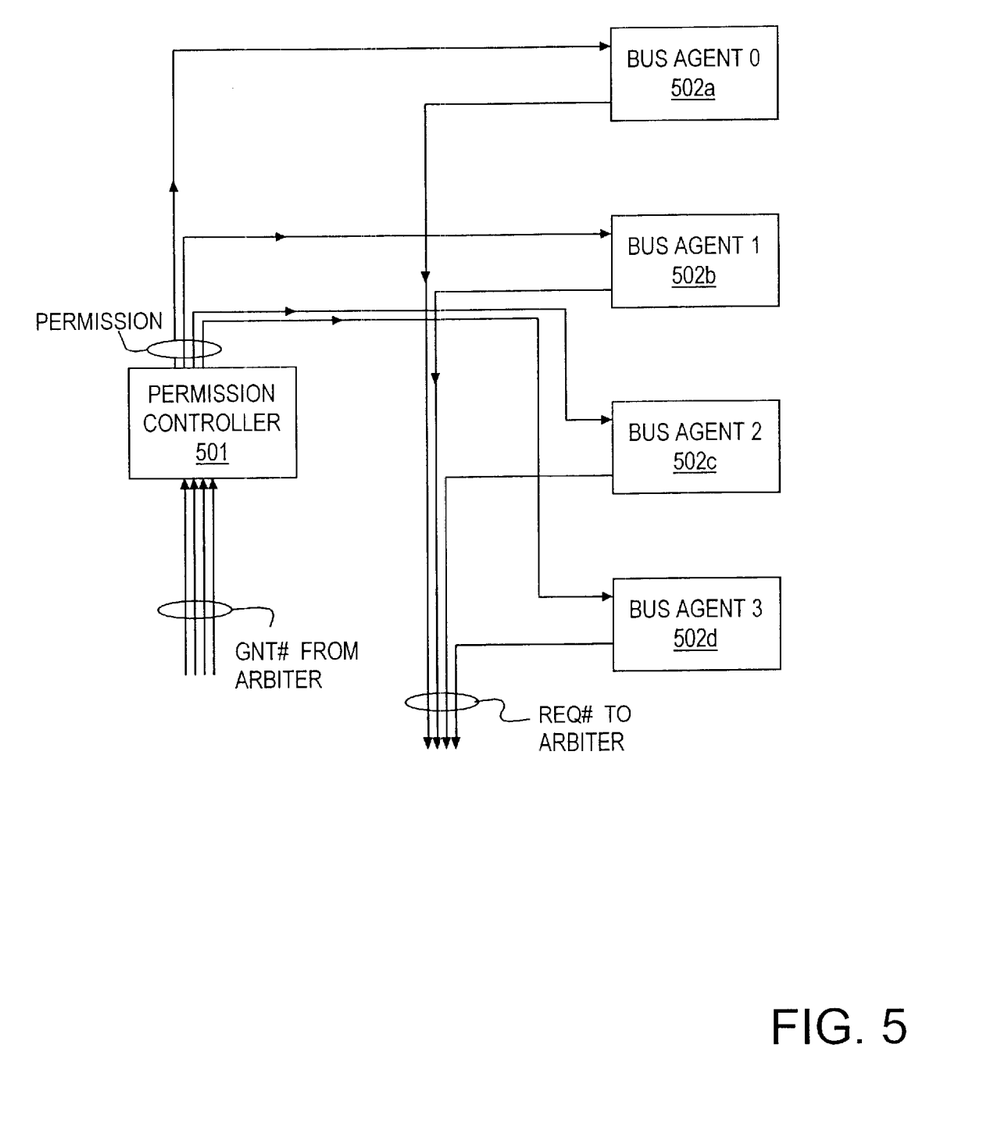
FIG. 5 illustrates selected components and signals in a data processing system according to one embodiment of the present invention.

Referring now to FIG. 5, a block diagram of selected elements of the combination 300 of data processing systems 301 depicted in FIG. 3 is presented to illustrate features of the invention enabling the delivery of PCI transactions to selected targets. In the depicted embodiment, combination 300 is illustrated as including a permission controller 501 that communicates with bus agents 502a, 502b, 502c, and 502d (generically or collectively referred to as bus agent(s) 502). Bus agents 502 represent any device attached to the local PCI bus 303 of FIG. 3 that is capable of initiating or receiving a PCI transaction. Thus, bus agents 502 may represent one of the data processing devices 301 depicted in FIG. 3 as well as the bus bridge 304 or any other peripheral device attached to bus 303 and assigned a portion of the bus address space. Permission controller 501 may be integrated into bus arbiter 302 or implemented as a stand-alone integrated circuit. In the stand-alone embodiment, permission controller 501 may comprise a field programmable gate array (FPGA) or other suitable application specific integrated circuit (ASIC).

Figure 6:
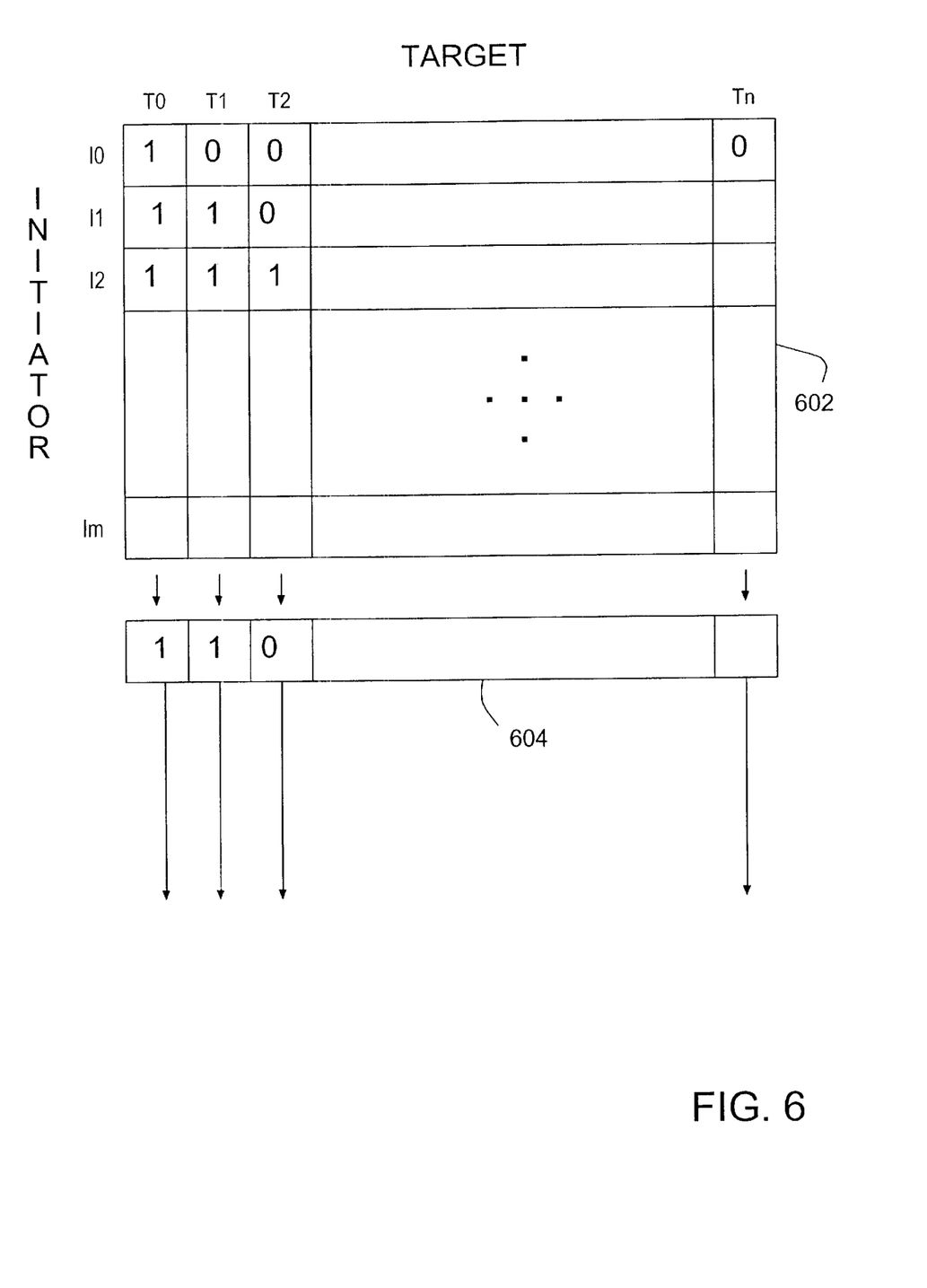
FIG. 6 illustrates a permission table and register according to one embodiment of the present invention.

Permission controller 501 receives the GNT# signals generated by arbiter 302. From these standard PCI signals, permission controller 501 is able to identify the initiator of a subsequent bus transaction. To implement the delivery of transactions on the shared bus to only selected targets, one embodiment of permission controller 501 includes a programmable table that indicates the permitted bus agent targets for each initiator. Referring now to FIG. 6, an embodiment of a permission table 602 (also referred to as IO/memory permission table 602) suitable for use in permission controller 501 is depicted. In the depicted embodiment, permission table 602 comprises an array of storage elements (memory) arranged as a set of rows and columns. Each row of permission table 602 corresponds to a potential initiator of a bus transaction while each column corresponds a potential target of a transaction. A permission bit is found at the intersection of each row and column in permission table 602. A permission bit indicates whether a bus agent corresponding to the permission bit's column address is permitted to receive transactions initiated by the bus agent corresponding to the permission bit's row address. In the depicted embodiment, a logical 1 permission bit indicates that the corresponding target device is permitted to receive transactions from the corresponding initiator. Because permission table 602 indicates permitted initiator/target pairs, permission controller 501 is not required to receive the REQ# signals from each bus agent. Instead, the permitted targets for a particular transaction are determined solely by the initiator (determined from the GNT# signals) and the information in the permission table thereby greatly simplifying the permission controller logic.

In the preferred embodiment, the permitted initiator/target pairs may be programmably modified by a user. In one embodiment, permission controller 501 and, more particularly, permission table 602 is assigned address space on the PCI bus thereby enabling dynamic modification of the assignment table. By appropriate writing to permission table 602, a user can programmably configure agents 502 on the bus to recognize transactions from only the desired initiators. To maintain the desired level of security, access to permission controller 501 may be limited to only a trusted master device, such as by programming the permission table at power on to allow the trusted master as the only permitted initiator of transactions to the permission controller. Alternatively, the security of the permission table may be maintained by connecting permission controller 501 to a dedicated management processor or service processor via a private bus.

There is no requirement that permission table 602 be programmed symmetrically. In other words, if a first bus agent may receive transactions from a second bus agent, there is no requirement that the second bus agent be programmed to receive transactions from the first bus agent. Depending upon the implementation, there may be a requirement that the identity permission bits (i.e., those permission bits in which the target and initiator are the same bus agent) are programmed to logical "1."

When arbiter 302 grants the bus to a requesting bus agent, the arbiter asserts the GNT# signal corresponding to that bus agent. The asserted GNT# signal indicates to permission controller 501 which of the bus agents is going to be the initiator of a transaction. The asserted GNT# signal is then used by permission controller 501 to select the row of permission table 602 corresponding to the bus agent that was granted bus mastership (i.e., the initiating bus agent). In one embodiment, permission controller 501 includes a permission output register 604 having a bit corresponding to each column in permission table 602. When the arbiter asserts one of the GNT# signals, the asserted GNT# signal selects a corresponding row of permission table 602. If a permission table row is selected during a PCI idle cycle, the contents of the selected row are transferred to permission output register 604. Thus, permission output register 604 may contain one or more logical 1's in bit positions corresponding to targets that are permitted to recognize transactions from the initiating bus agent, and one or more logical 0's in bit positions corresponding to targets that are not permitted to recognize transactions from the initiating bus agent.

Figure 7:
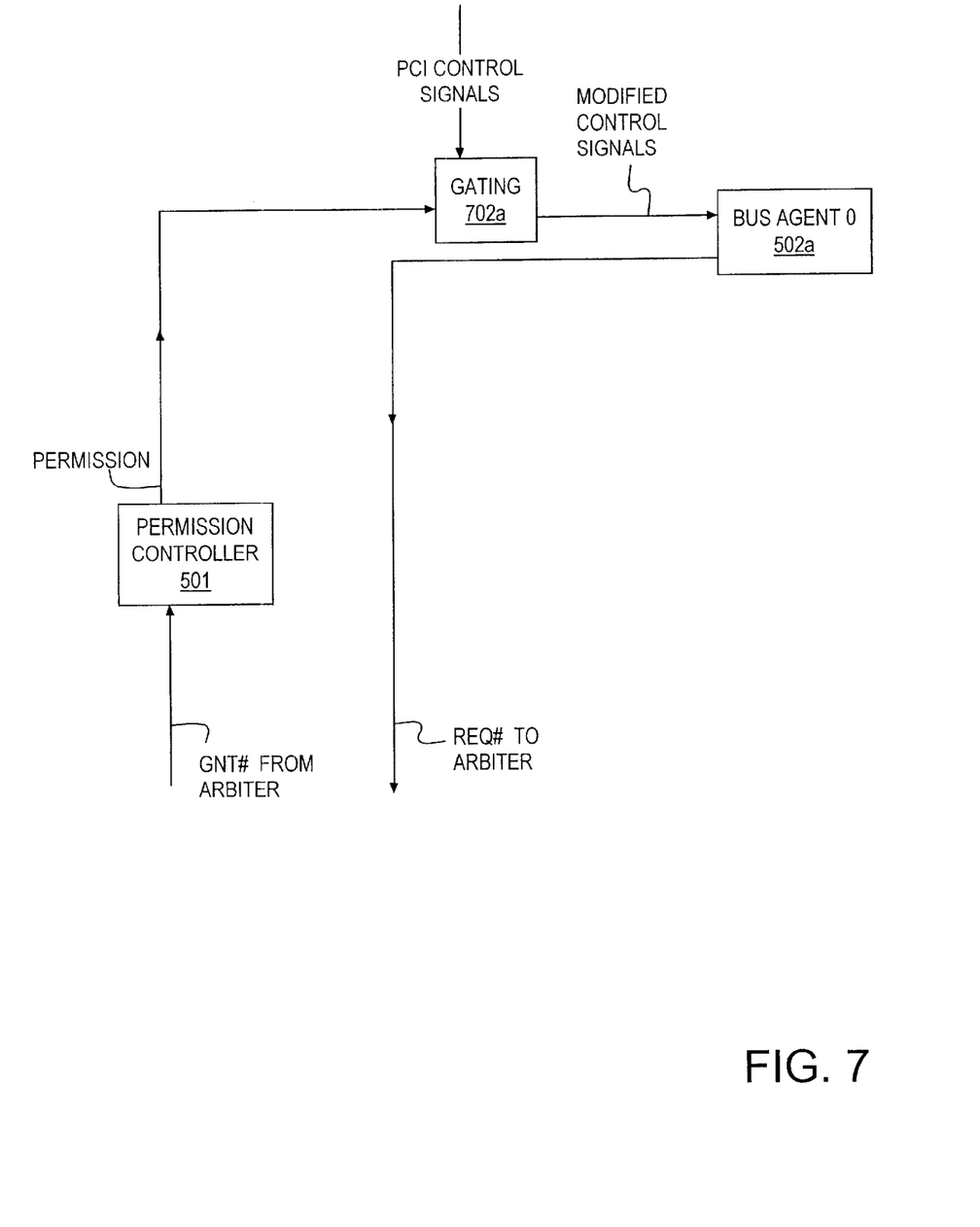
FIG. 7 is a block diagram of selected features of the system emphasizing the gating circuit associated with a corresponding bus agent.
Figure 8:
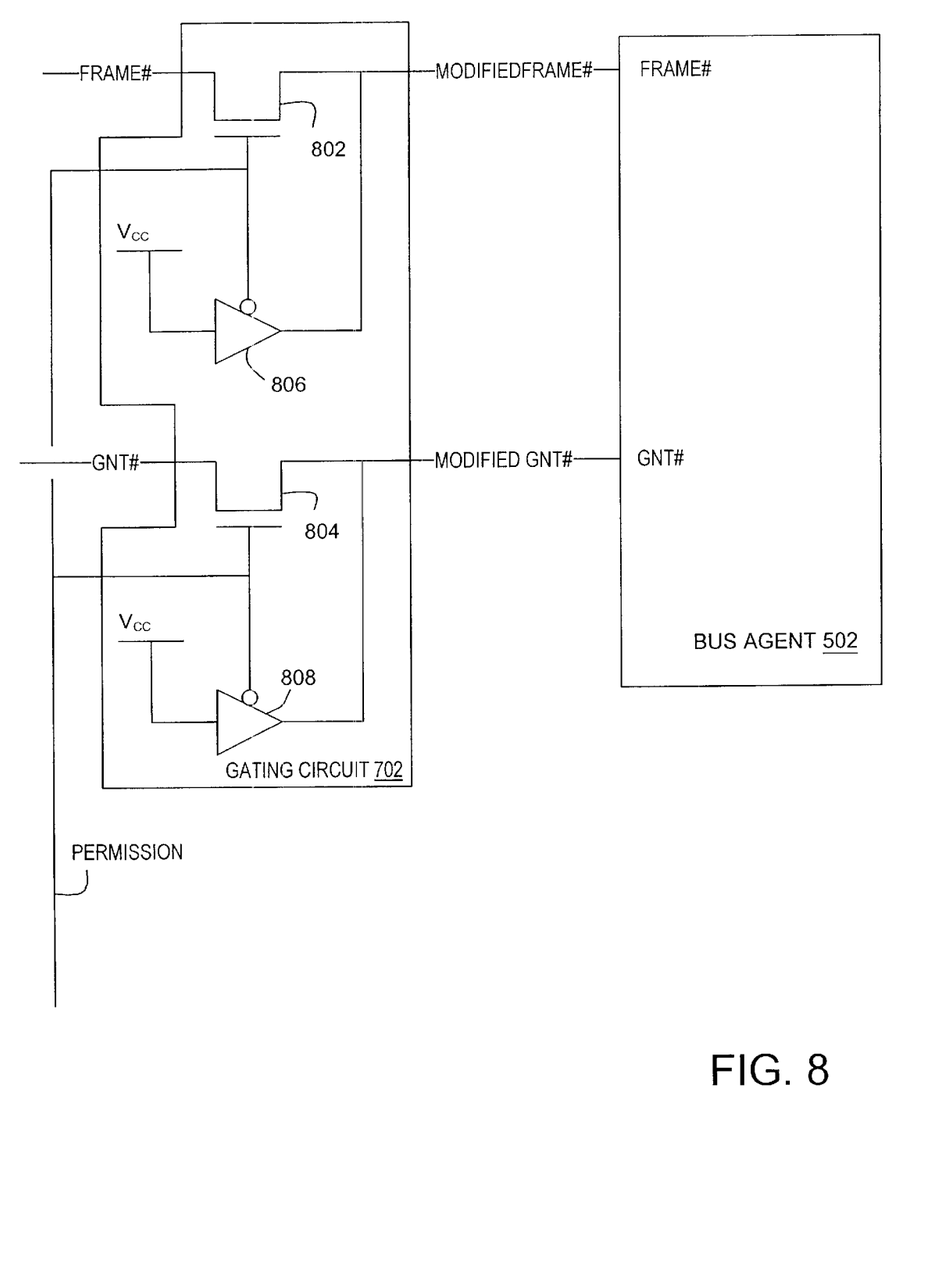
FIG. 8 is a circuit diagram of an embodiment of the gating circuitry of FIG. 7.

Referring now to FIGS. 7 and 8, an embodiment of the invention is depicted in which each of the permission bits provides an input to a corresponding gating circuit 702 (one of which is identified in FIG. 7 by reference numeral 702a) associated with each bus agent 502 that is a potential target of a transaction. Each gating circuit 702 is preferably implemented as hardware that is external to its corresponding bus agent 502. In this manner, the bus agents themselves require no hardware or software modification to function properly according to the invention. Each gating circuit 702 may be attached to the same printed circuit board as its corresponding bus agent 502. In an embodiment where each bus agent 502 is attached to a single circuit board, the various gating circuits 702 may be implemented in one or more discrete chips that are preferably attached in close proximity to a corresponding bus agent 502.

The embodiment of gating circuit 702 depicted in FIG. 8 is configured to receive and modify a bus control signal (such as the PCI FRAME# signal) and the GNT# signal corresponding to bus agent 502 based upon the state of the permission bit associated with bus agent 502. More specifically, the permission bit provides a control input to a first pass transistor 802 and a second pass transistor 804 as well as to first and second tri-state drivers 806 and 808. First pass transistor 802 gates the FRAME# signal generated by the initiating bus agent while second pass transistor 804 gates the appropriate GNT# signal from arbiter 302. When the permission bit is asserted (logical "1"), the outputs of drivers 806 and 808 are tri-stated and transistors 802 and 804 provide a low impedance path between the FRAME# signal and the GNT# signal respectively to the FRAME# pin and GNT# pin on the targeted bus agent 502. When the permission bit is de-asserted, pass transistors are effectively open circuited such that the FRAME# and GNT# signals are isolated from bus agent 502. In this case, the FRAME# and GNT# pins of bus agent 502 are maintained at a logical high by drivers 806 and 808 respectively, which have inputs that are connected to VCC.

Gating circuit 702 ensures that a bus agent that is not permitted to receive a transaction (based on the permission bits from permission controller 501) is effectively prevented from recognizing transactions. Because a PCI compliant device must detect a negative transition of the FRAME# signal to sense a transaction, those bus agents corresponding to logical "0" permission bits will not see any transactions on the bus. If an initiator sends a transaction having an address corresponding to the address space of a target device that the initiator is prohibited from communicating with, the target will not detect the transaction and the initiator will eventually abort. In this manner, the provided method of isolating selected devices from the bus is independent of the bus address mapping.

Gating circuit 702 may be simplified in an embodiment in which the permission controller is an integrated component of the bus arbiter 302. In this embodiment, the arbiter 302 can use permission bits to prevent the assertion of the appropriate GNT# such that local modification of the GNT# signals by gating circuit 702 is unnecessary. The gating circuit 702 may therefore be required only to modify the FRAME# signal and may be simplified by the removal of pass transistor 804 and driver 808.

One application of the invention includes the disabling of a faulty bus agent. If it is determined that a particular bus agent is malfunctioning, the faulty bus agent may be universally prohibited as a transaction target by setting all permission bits associated with the faulty bus agent to logical "0". In an embodiment in which the permission controller is integrated with the arbiter, the arbiter may be configured to recognize that, if a particular bus agent has no permitted targets, that bus agent should never be granted mastership of the bus. In this manner, the arbiter can preserve bus bandwidth by preventing a faulty device from consuming bus cycles.

The present invention may impact certain systems that implement "pipelined" PCI bus grants. A "pipelined" bus grant is said to occur when the arbiter grants permission to a new bus agent before the current initiator has relinquished the bus. Notwithstanding the grant, the new bus agent must still wait for an idle cycle on the PCI bus before initiating a transaction. In fact, the arbiter may even remove the grant from the new bus agent and give the grant to another bus agent at any time before the new bus agent has actually started its transaction.

More specifically, if the permission controller is integrated with the PCI bus arbiter, then the preferred embodiment of the arbiter logic would prevent the arbiter from pipelining the bus grant to a bus agent that is currently isolated (i.e., prevented from receiving transactions by its permission bit). Because isolated bus agents always observe FRAME# high (deasserted), an isolated agent that receives a pipelined GNT# could sense a false "bus idle" condition (if the isolated device also observed a high (deasserted) PCI bus signal IRDY#). Under these circumstances, the isolated device might initiate a transaction, which would erroneously interfere with the current bus activity.

The gating of the GNT# signal in one embodiment of the invention is only necessary when the permission controller is separate from or not well-integrated with the PCI bus arbiter and the PCI bus arbiter is known to pipeline the bus grants. By isolating the GNT# signal along with the FRAME# signal in this case, the permission controller insures that an isolated bus agent will never see a bus grant during the period that the agent is isolated. If the permission controller is well-integrated with the arbiter, however, only a simple change to the arbiter logic is required to insure that isolated bus agents never receive pipelined grants.

Figure 9:
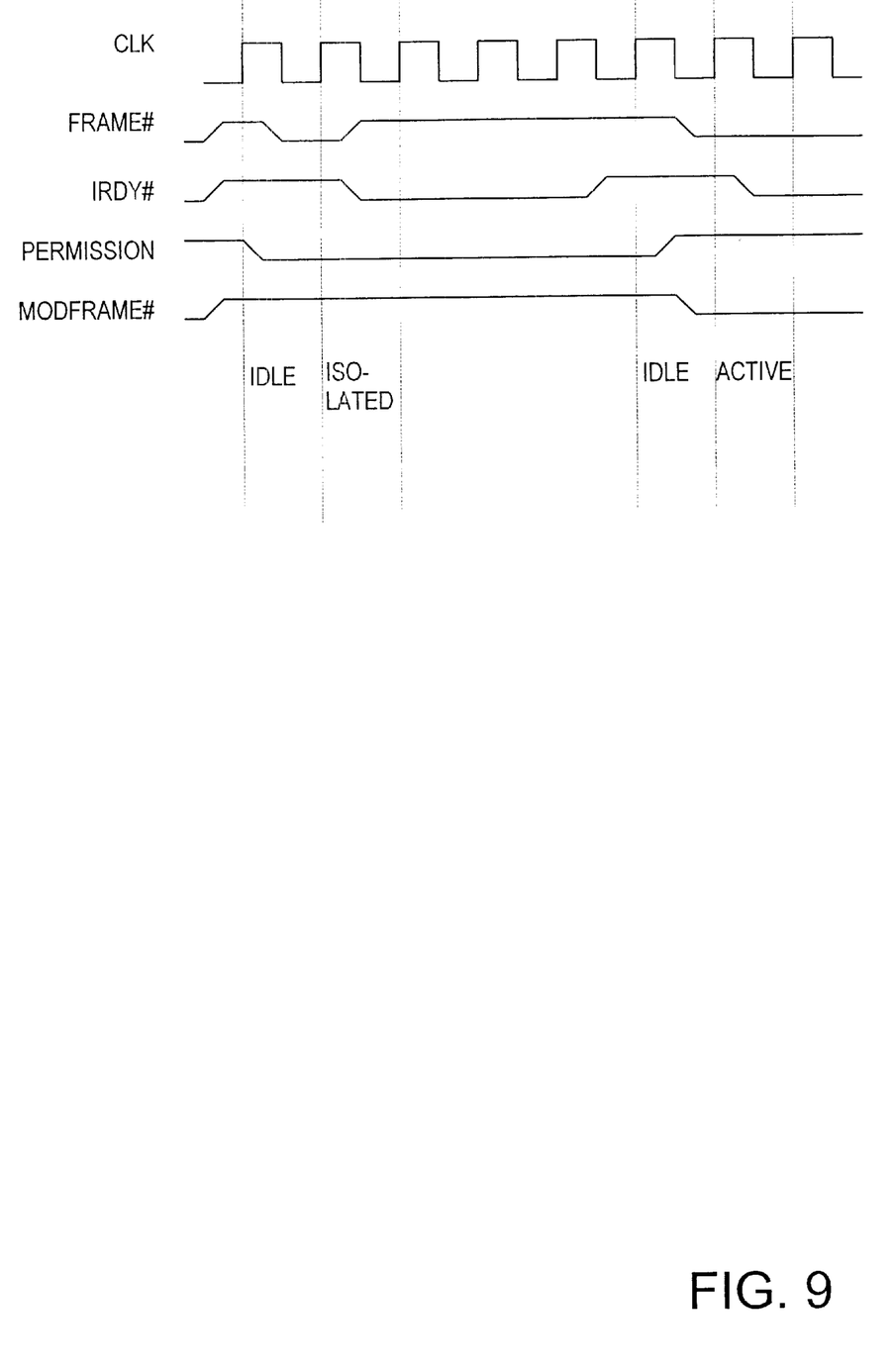
FIG. 9 is a timing diagram illustrating operation of the present invention.

Referring to FIG. 9, a timing diagram is presented to illustrate operation of an embodiment of the present invention. The CLK, FRAME# and IRDY# signals are the standard PCI bus signals. The PERMISSION and MOD-FRAME# signals are dedicated to a particular target device. An idle cycle is depicted in which the FRAME# and IRDY# signals are high when the CLK signal transitions from low to high (signaling the start of a cycle). Prior to the idle cycle, the PERMISSION signal for the target was high (the target had permission to observe the transaction), so the MOD-FRAME# signal followed the global FRAME# signal. At the idle cycle, the permission controller observes that the target does not have permission to observe transactions from the initiator holding the current bus grant, and drives the PERMISSION signal low. After the permission signal transitions to low, however, the MODFRAME# signal (the signal that is connected to the target's FRAME# pin) is isolated from FRAME# and maintained at logical high thereby isolating the target from the bus. Note that, during the cycle designated as an isolation cycle, an active PCI cycle is triggered (FRAME# low and IRDY# high at the beginning of the cycle) but the isolated device does not recognize the transaction and will not respond to the transaction. At the end of the transaction the bus returns to the idle state (FRAME# high and IRDY# high). At this point the permission signal may again go high in response to a bus grant to an initiator from which the target is permitted to receive transactions. With the permission signal high, the MODFRAME# signal tracks the FRAME# signal and the target is "active" and therefore able to recognize and respond to the transaction.

The invention may be extended to include multiple permission signals per bus agent. The use of multiple permission signals may be used beneficially to assign a first set of permitted initiator/target pairs for a first type of bus transaction and a second set of permitted initiator/target pairs for a second type of bus transaction. In the case of a PCI bus, for example, the permission controller 501 may include a first permission table with permission signal information (i.e., permission bits) indicating permitted initiator/target pairs for IO/memory transactions and a second permission table with permission signal information indicating permitted initiator/target pairs for configuration transactions. More specifically, it may be desirable to include a separate permission table (or to add a second bit to each cell in the permission table 602 described above) for determining configuration permission. In one embodiment, this second table may be used to indicate permitted target/initiator pairs for "type 0" PCI configuration transactions (whereas, "type 1" configuration transactions, which are directed to PCI-to-PCI bridges, may be permitted/prohibited using the permission table and GNT# signal gating circuitry described above).

Figure 10:
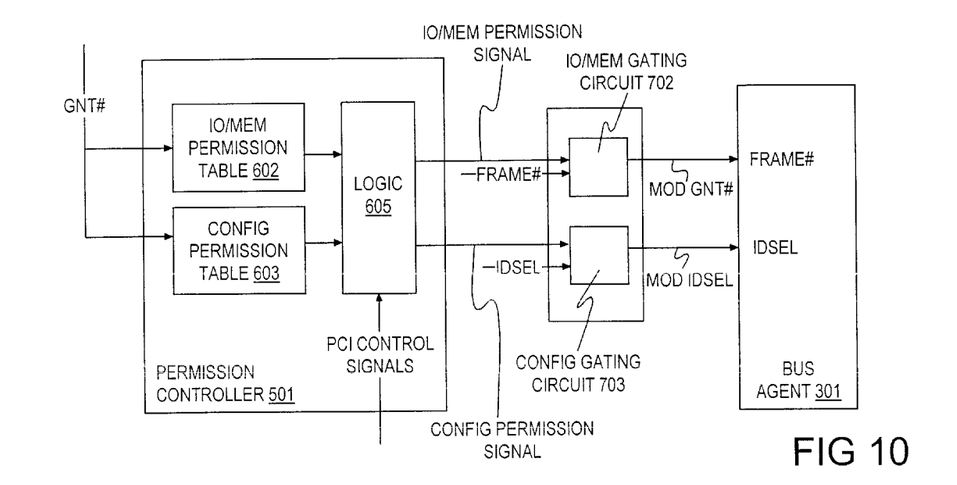
FIG. 10 is a block diagram illustrating an embodiment of the invention extended to include multiple permission signals per target to permit/prohibit multiple types of transactions selectively.

Referring to FIG. 10, the depicted embodiment of permission controller 501 includes an IO/memory permission table 602 as described previously and a configuration permission table 603. Like IO/memory permission table 602, configuration permission table 603 receives GNT# signals (only one of which is shown) corresponding to each potential initiator from the arbiter. The asserted GNT# signal selects a set of values (e.g., a row of values) in configuration permission table 603, where each bit in the selected set of values corresponds to a bus agent target. Each bit in the selected set of values indicates whether the corresponding initiator/target pair is permitted for type 0 configuration transactions. The selected set of values are output from configuration permission table 603 and may be provided to a logic block 605 that receives one or more PCI control signals. The logic block 605 provides a means for gating the permission information output from configuration permission table 603 (as well as from IO/memory permission table 602) to the appropriate PCI device. Logic block 605 may, for example, prohibit permission signals transitions during non-idle cycles.

Thus, the permission controller 501 depicted in FIG. 10 generates a pair of permission signals for each target device. The first permission signal indicates whether the corresponding target is permitted to receive IO/memory transactions from the current initiator while the second permission signal indicates whether the target may receive configuration transactions from the initiator. In this manner, the embodiment of the invention depicted in FIG. 10 enables a user to distinguish between the initiator/target pairs that are permitted for IO/memory transactions and the initiator/target pairs permitted for configuration transactions.

Whereas the first permission signal (the IO/memory permission signal) generated by permission controller 501 provides a gating signal for the corresponding device's PCI FRAME# signal as described previously, the second permission signal (the configuration permission signal) provides a gating signal for the corresponding device's IDSEL signal. To accomplish this gating, the configuration permission signal is provided to an IDSEL gating circuit 703.

Figure 11:
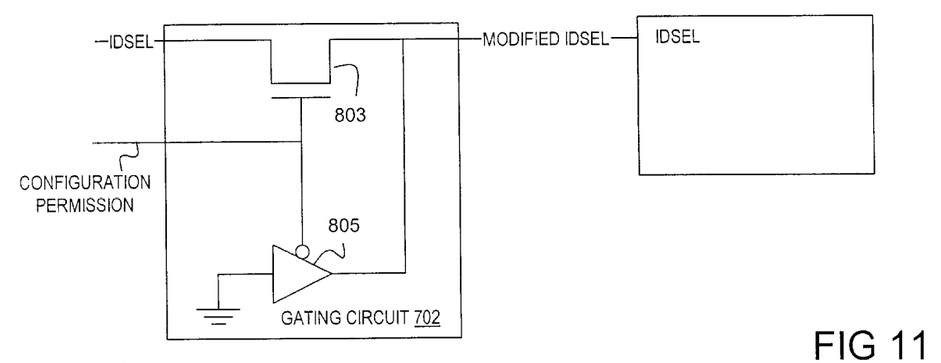
FIG. 11 is a circuit diagram of a gating circuit suitable for use in the embodiment depicted in FIG. 10.

Referring now to FIG 11, the depicted embodiment of IDSEL gating circuit 703 is substantially similar to the gating circuit 702 described above. Gating circuit 703 is configured to receive and modify the IDSEL signal corresponding to a bus agent based upon the state of the configuration permission signal associated with the bus agent. More specifically, the configuration permission signal provides a control input to a pass transistor 803 and to a tri-state driver 805. Pass transistor 803 gates the IDSEL signal generated by the initiating bus agent. When the configuration permission bit is asserted (logical "1"), the output of driver 805 is tri-stated and transistor 803 provides a low impedance path between the IDSEL signal and the IDSEL pin on the target bus agent 502. When the permission bit is de-asserted, pass transistor 803 is effectively open circuited such that the IDSEL signal is isolated from bus agent 502. In this case, the IDSEL pin of bus agent 502 is maintained at a logical low by the activated driver 805, which has an input connected to ground.

It will be apparent to those skilled in the art having the benefit of this disclosure that the present invention contemplates a system and method for enabling selective and secure transaction routing over a shared bus such as a PCI bus. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   a set of bus agents connected to a bus;
   a bus arbiter connected to the bus and configured to receive a bus request signal from each of the bus agents and, responsive thereto, to provide a bus grant signal to each of the bus agents, wherein the bus grant signals indicate which bus agent is granted mastership of the bus to initiate a bus transaction; and
   a permission controller configured to receive at least one of the bus grant signals from the arbiter and, responsive thereto, to generate a first permission signal wherein the state of the first permission signal indicates that the corresponding bus agent is prohibited as a target of a first type of bus transaction from the initiating bus agent.

2. The system of claim 1, wherein the permission controller is dynamically alterable to control whether the permission signal for a given initiator-target pair is asserted.

3. The system of claim 1, wherein the permission controller includes storage containing a permission table wherein the contents of the permission table indicate permitted combinations of bus agent initiators and bus agent targets.

4. The system of claim 3, wherein the permission table includes a row corresponding to each potential initiator bus agent and its associated grant signal and a column corresponding to each potential target bus agent and wherein each bit in the table indicates whether the corresponding initiator-target pair is permitted.

5. The system of claim 4, wherein the permission controller further includes a permission output register and wherein the permission controller is configured to transfer the contents of the permission table row corresponding to the asserted grant signal to the permission output register.

6. The system of claim 1, wherein the permission controller is further configured to generate a second permission signal responsive to the at least one bus grant signal wherein the state of the second permission signal indicates that the corresponding bus agent is prohibited as a target of a second type of bus transaction from the initiating bus agent.

7. The system of claim 1, further comprising gating logic associated with at least one target bus agent, wherein the gating logic is configured to receive the permission signal corresponding to the target bus agent from the permission controller and a bus control signal from the initiator bus agent, and wherein the gating logic isolates a control pin of the target bus agent from the bus control signal when the permission signal is asserted.

8. The system of claim 7, wherein the gating logic includes a pass transistor controlled by the permission signal wherein the pass transistor comprises a low impedance path between the bus control signal and the target bus agent when the permission signal is asserted.

9. The system of claim 8, wherein the gating logic further includes a line driver having an output connected to a control pin of the bus agent target device and controlled by the permission signal such that the line driver drives the control pin to a predetermined state when the bus control signal is isolated from the target bus agent.

10. The system of claim 7, wherein the gating logic is further configured to receive the grant signal associated with the target device and to isolate the grant signal from the target device depending upon the state of the permission signal.

11. The system of claim 1, wherein the permission controller comprises an integrated portion of the arbiter.

12. A permission controller suitable for connecting to a bus in a data processing system, the controller comprising permission control logic configured to receive a plurality of grant signals generated by a bus arbiter wherein the grant signals indicate which of a set of corresponding bus agents is granted mastership of the bus and further configured to generate at least one permission signal responsive to the grant signals and indicative of whether a corresponding bus agent is permitted as a target of a transaction initiated by the granted bus agent.

13. The controller of claim 12, wherein the controller may be dynamically altered to modify the state of the permission signal corresponding to a selected initiator-target pair.

14. The controller of claim 13, wherein the controller is alterable only by selected bus agents.

15. The controller of claim 14, wherein the selected bus agents are determined when the data processing system is powered on.

16. The controller of claim 12, further wherein the controller includes storage containing a permission table wherein the contents of the permission table indicate permitted combinations of bus agent initiators and bus agent targets.

17. The controller of claim 16, wherein the permission table includes a row corresponding to each potential initiator bus agent and its associated grant signal and a column corresponding to each potential target bus agent and wherein each bit in the table indicates whether the corresponding initiator-target pair is permitted.

18. The controller of claim 17, further comprising a permission output register wherein the controller is configured to transfer the contents of the permission table row corresponding to the asserted grant signal to the permission output register.

19. A method of selectively targeting bus agents on a shared bus of a data processing system, comprising:

responsive to a plurality of grant signals indicating which of a plurality of bus agents connected to the shared bus has been granted mastership of the bus, asserting at least one permission signal indicating that a corresponding bus agent is prohibited as a target of a transaction initiated by the granted bus agent; and responsive to the assertion of the at least one permission signal, preventing a corresponding bus agent from detecting a bus transaction initiated by the granted master.

20. The method of claim 19, further wherein the controller includes storage containing a permission table wherein the contents of the permission table indicate permitted combinations of bus agent initiators and bus agent targets.

21. The method of claim 20, wherein the permission table includes a row corresponding to each potential initiator bus agent and its associated grant signal and a column corresponding to each potential target bus agent and wherein each bit in the table indicates whether the corresponding initiator-target pair is permitted.

22. The method of claim 21, further comprising a permission output register wherein the controller is configured to transfer the contents of the permission table row corresponding to the asserted grant signal to the permission output register.

* * * * *